July 23, 1963  E. C. ELSNER  3,098,456
RAILROAD BOX CAR
Filed May 8, 1961  3 Sheets-Sheet 1
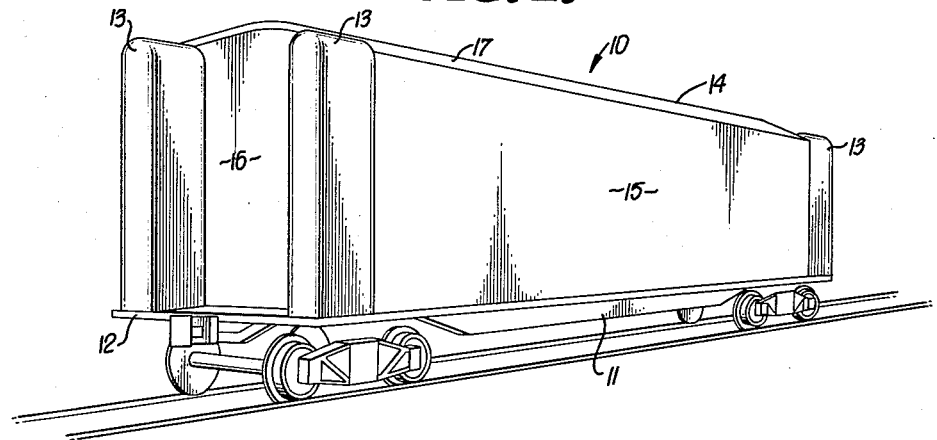
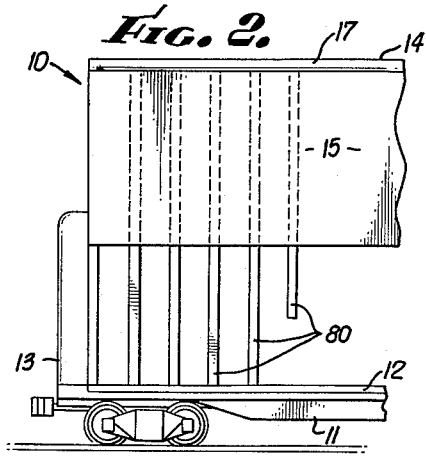
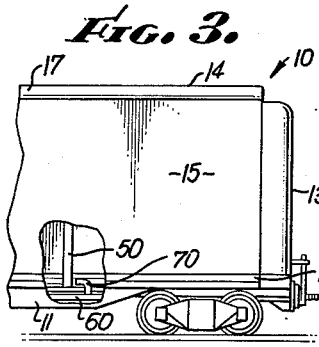
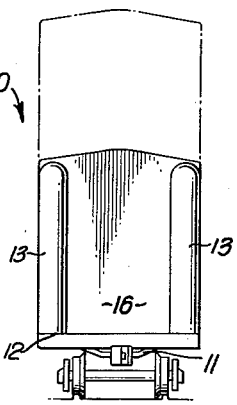
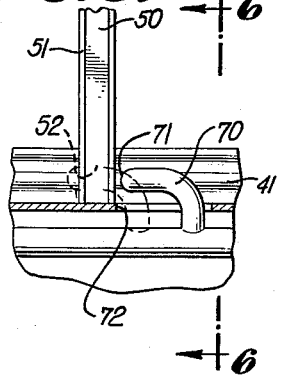
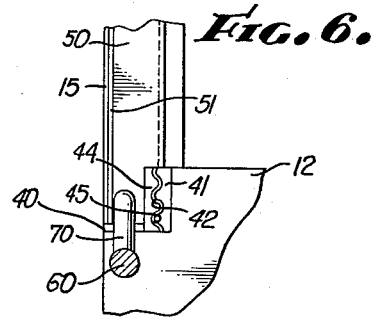
INVENTOR.
EDWIN C. ELSNER
BY
George H. Halbert
ATTORNEY.

July 23, 1963
E. C. ELSNER
3,098,456
RAILROAD BOX CAR
Filed May 8, 1961
3 Sheets-Sheet 2
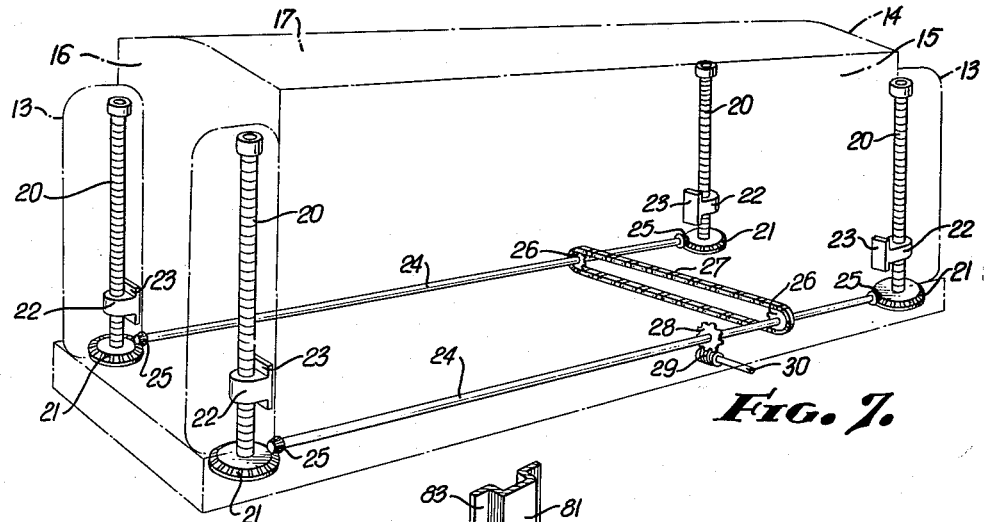
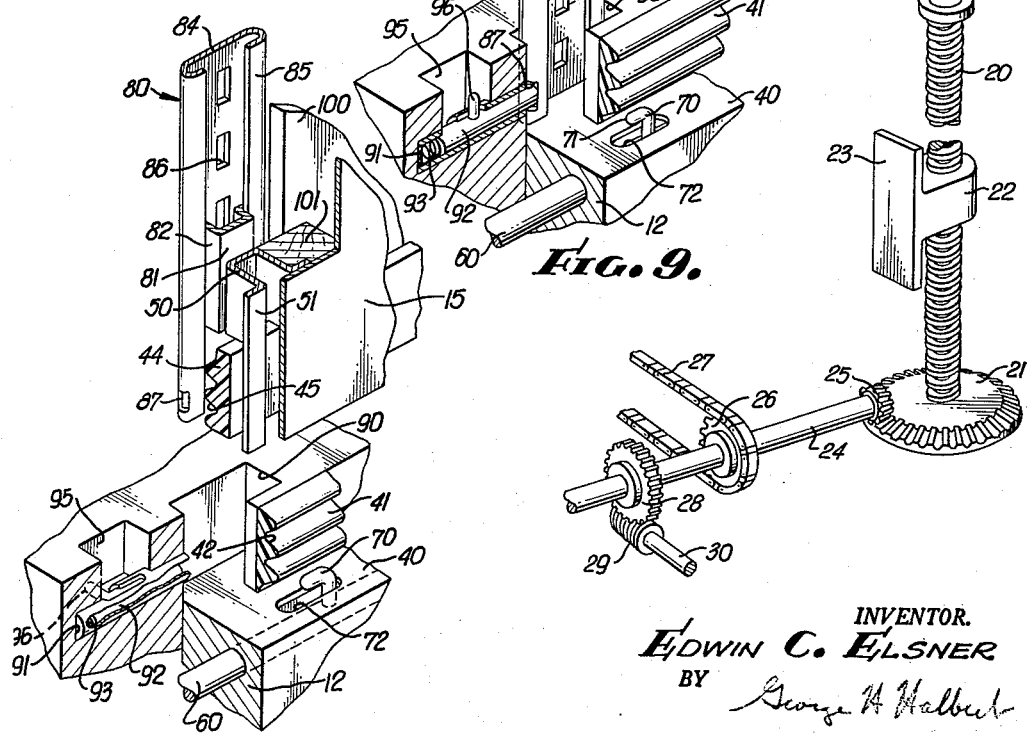
INVENTOR.
EDWIN C. ELSNER
BY
George H Halbert
ATTORNEY.

July 23, 1963 E. C. ELSNER 3,098,456
RAILROAD BOX CAR
Filed May 8, 1961 3 Sheets-Sheet 3
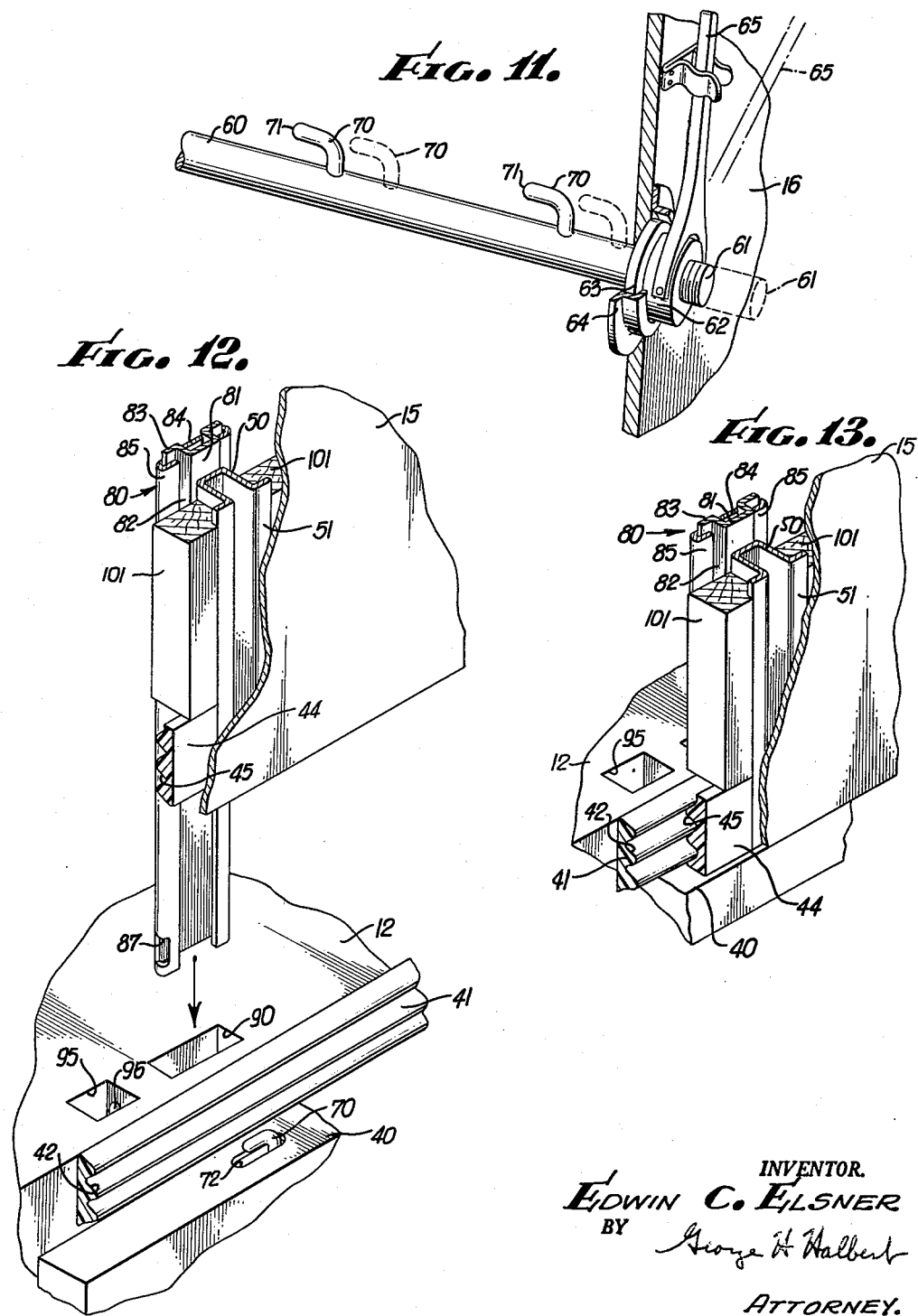
INVENTOR.
EDWIN C. ELSNER
BY George H. Halbert
ATTORNEY.

United States Patent Office 3,098,456
Patented July 23, 1963

3,098,456
RAILROAD BOX CAR
Edwin C. Elsner, 695 Columbia St., Pasadena, Calif.
Filed May 8, 1961, Ser. No. 108,609
3 Claims. (Cl. 105—379)

This invention relates to a railroad box car.

The railroad box car is extensively used to transport cargo because its envelope body gives covered protection to transported goods. However, the use of the normal box car is limited by reason of the fact that the envelope body structure is rigidly mounted on the body frame, and access to the inside of the car is limited by the size of the doors in the envelope, which are generally located on opposite sides of the envelope approximately at the center of the car. If bulky articles or packages are desired to be transported in such a car, their size is restricted by the size of the access door to be used. Furthermore, if it is desired to load the car by using modern cargo handling equipment, such as lift trucks, the size of such cargo handling equipment is similarly restricted, and there are severe limitations on the maneuverability of such equipment within the car. Additionally, it is generally impossible to provide direct loading from a carrier truck or trailer to the inside of such a car, and further time-consuming and sometimes costly cargo handling is required. Furthermore, all loading must be accomplished at the center of the car, and end loading, often substantially more efficient, is not possible.

Many attempts have been made to overcome the use limitations of the standard box car. Movable roofs, movable floors, hinged sides and side panels, and other devices and methods have been utilized, but none of them have been able to overcome all of the severe use limitations of a box car.

It is therefore an object of the present invention to provide a box car with an envelope body that may be lifted intact, by self-contained means, completely off the floor or bed of the car so as to achieve ready access to the floor or loading bed from any part of either side or from either end, with a minimum of obstruction.

It is another object of the invention to provide such a car in which, after loading, the envelope body may be lowered again into firm, dust and weather sealed position by the same self-contained means.

It is still another object of the invention to provide such a car in which the self-contained lifting and lowering means are located in corner posts which do not substantially restrict the accessibility of the floor or bed.

It is a further object of the invention to provide such a car in which the envelope is firmly locked on the car bed and tightly sealed against the elements, but in which the envelope may be readily unlocked and unsealed, raised, lowered, relocked and resealed.

It is still a further object of the invention to provide such a car which is sturdy in construction but still capable of great flexibility of use.

With these and other objects in view, the invention consists of the construction, arrangement and combination of the various parts of the device whereby the objects contemplated are attained, as hereinafter set forth, pointed out in the appended claims, and illustrated in the accompanying drawings.

In the drawings:

FIGURE 1 is a perspective view of the car with the envelope body in lowered position.

FIGURE 2 is a cut-away side elevational view of one end of the car with the envelope in raised position.

FIGURE 3 is a cut-away side elevational view of the other end of the car with the envelope in lowered position.

FIGURE 4 is an end elevational view of the car with the envelope in lowered position but shown in phantom in raised position.

FIGURE 5 is an enlarged, detailed, cut-away view of the means for securing the envelope to the car bed.

FIGURE 6 is a view taken on the line 6—6 of FIGURE 5.

FIGURE 7 is a perspective view, partly in phantom, showing the elevating mechanism for raising and lowering the envelope body.

FIGURE 8 is an enlarged, detailed, cut-away view of one of the telescoping side-post assemblies in raised position.

FIGURE 9 is an enlarged, detailed, cut-away view, somewhat similar to FIGURE 8, of the telescoping side-post assembly in a lowered position.

FIGURE 10 is an enlarged, detailed, cut-away view of a part of the elevating mechanism shown in FIGURE 7.

FIGURE 11 is an enlarged, detailed, perspective view of the locking mechanism for securing the envelope body in lowered position.

FIGURE 12 is another enlarged, detailed, cut-away view of one of the telescoping side-post assemblies in raised position.

FIGURE 13 is a view similar to FIGURE 12, but showing the telescoping side-post assembly in lowered position.

As illustrated in the drawings, a railroad box car 10 has an undercarriage 11 and a rectangular floor or bed 12 mounted on said undercarriage 11. Mounted at the four corners of said floor or bed 12, and protruding upwardly therefrom, are corner post housings 13 which support an envelope body 14 in the manner hereinafter described. Said envelope 14 has side members 15, end members 16, and a roof 17, all formed as an integral unit.

Disposed in said corner post housings 13 and mounted on floor 12 are means for raising and lowering said envelope 14. In the preferred form of the device, best illustrated in FIGURES 7 and 10 of the drawings, said elevating means may comprise elongate screws 20 vertically, rotatably disposed in said housings 13. At the lower extremities of each of said screws 20 is a beveled or miter gear 21, and mounted on each of said screws 20, intermediate the ends thereof, is a nut 22, disposed so as to move up and down on its screw 20 as said screw 20 is rotated. Each of said nuts 22 is rigidly mounted on an end member 16 of envelope 14 by any suitable means, such as by a plate 23 welded on nut 22 or formed as an integral part thereof, and fastened to an end member 16, by welding, by bolts (not shown), or otherwise.

Transverse longitudinal rods 24 extend parallel to the sides of car 10, from each beveled gear 21 at one end of car 10 to the beveled gear 21 at the other end of car 10 on the same side of car 10, and said rods 24 have mitre beveled gears 25 mounted on their ends and disposed so as to mesh with gears 21 so that rotational movement imparted to rods 24 will cause rotational movement in screws 20.

Intermediate the ends of rods 24, in aligned relationship with each other, are sprockets 26, and an endless chain 27 is mounted on said sprockets 26 so as to interconnect the same and transmit rotational movement in either rod 24 to the other. Also intermediate the ends of one of the rods 24 is a worm gear 28 which meshes with a worm 29 mounted on a shaft 30 which protrudes outwardly from the side of car 10 in position to have any desirable rotational power means (not shown) applied thereto.

Rotational power applied to shaft 30 will cause worm gear 28, meshed with worm 29, to rotate, thus rotating rods 24 and screws 20, so that envelope 14 will be raised or lowered, dependent on the direction of the rotational force applied.

In order to provide dust-proof, weather-proof sealing between sides 15 and ends 16 of envelope 14 with floor or bed 12, when envelope 14 is in lowered position, a labyrinth seal of durable, somewhat flexible, material, such as neoprene, is provided. To accommodate one-half of said seal a step 40 may be formed around the entire outer edge of floor 12, and an elongate strip of such material 41 is mounted on the vertical cut of said step 40. Said strip 41 has a corrugated surface 42 facing outwardly from said vertical cut. A second elongate strip 44 of said flexible material is mounted on the side posts hereinafter mentioned, and has its corrugated surface 45 disposed so as to mate with corrugated surface 42 of strip 41 when envelope 14 is in full lowered position.

To strengthen side members 15 of envelope 14, permanent vertical side posts 50, spaced apart from each other, generally at regular intervals, are mounted on the inside surface of said side members 15. Said side posts 50 may be of any desired configuration which will permit the ready mounting of said side posts 50 to side members 15. As illustrated in the drawings, said side posts may be of U-shaped configuration, having foot members 51 to which side members 15 are fastened.

Adjacent the bottom of said side posts 50 an aligned lateral opening 52 is provided.

An elongate bar 60 is disposed below step 40 of floor 12, on both sides of car 10. Each of said bars 60 is rotatably supported at the ends 16 of car 10. Each bar 60 has a threaded protruding end 61. A nut 62 is mounted on said threaded end 61. Said nut 62 is rotatably secured at the end 16 of car 10. A preferred means of securing said nut 62 is by providing an annular flange 63 on said nut 62 and confining said flange 63 in a securing ring 64. A handle 65 may be mounted on said nut 62 and disposed so that rotational force applied to said handle will turn said nut 62 on said threaded end 61 of rod 60 and, dependent on the direction of force applied, rod 60 will be moved either inwardly or outwardly.

Mounted on the upper peripheral surface of each of said rods 60 and protruding upwardly therefrom are a series of spurs 70, having end portions 71 bent substantially parallel to the said peripheral surface of each rod 60. Said spurs 70 are spaced apart from each other and disposed so that each of said end portions 71 may be selectively disposed in one of the openings 52 in each of said side posts 50 when the envelope 14 is in lowered position. To give access to said end portions 71 to said openings 52, openings 72 are provided in floor 12, and said spurs 70 are movably disposed in said openings 72, with end portions 71 protruding therefrom.

When envelope 14 is in lowered position, movement of rods 60 to the left (in the positions shown in the drawings) will cause ends 71 of spurs 70 to enter openings 52, and thus lock envelope 14 in its lowered position, with a tight labyrinth formed by mated strips 41 and 44. To unlock said envelope 14 and permit it to be elevated, movement of rods 60 to the right will move said ends 71 of spurs 70 out of said openings 52, thus freeing side posts 50 and the entire envelope 14 for upward movement.

Rather than make the entire floor 12 readily accessible from the sides of car 10 whenever envelope 14 is raised, it may be desired to leave certain selected vertical side braces in lowered position, as when car 10 already has cargo loaded on floor 10 adjacent either or both ends 16 of car 10, and particularly if cargo cross-bracing or second decking has been mounted adjacent said ends. To accomplish that purpose, telescoping vertical braces 80 are provided.

Telescoping braces 80 have vertically disposed U-shaped sliding members 81 which, for convenience, may be mounted back-to-back on side posts 50. The legs 82 of slidings members 81 have outwardly directed flanges 83 formed at their ends.

An elongate vertical track 84 has its edges 85 bent inwardly, and a sliding member 81 is slidably disposed in each of said tracks 84, with flanges 83 of sliding member 81 disposed under said edges 85 of track 84. Track 84 may be provided with a plurality of openings 86 to serve as anchor means for cross-bracing or second decking (not shown). Adjacent its lower extremity, each track 84 has a lateral opening 87.

Floor 12 has a series of vertical openings 90 disposed adjacent to step 40 on each side of car 10, each of said openings 90 being adapted to receive one of said tracks 84. A lateral bore 91, having access at one end thereof to each of said openings 90, is formed in floor 12, and disposed in each of said bores 91 is a sliding bolt 92, which is seated against a compression spring 93, in turn seated on a closed end of bore 91 and disposed so as to bias bolt 92 toward opening 90. Each bolt 92 is adapted to be received in an opening 87 in a track 84 when said track is disposed in an opening 90 in floor 12, and thus to lock track 84 in lowered position.

Because it may be desirable to selectively raise certain of said telescoping vertical side braces, while leaving others of them in lowered, latched position, when envelope 14 is raised, means are provided for selectively sliding bolts 92, against the biasing force of springs 93, away from openings 87 in tracks 84, thus to unlock said tracks 84 from floor 12. Vertical openings 95 are made in floor 12 and disposed so as to give access to bolts 92 in bores 90, intermediate the ends of said bolts 92. Upwardly protruding spurs 96 are mounted on said bolts 92 and disposed in said openings 95. By contact through openings 95 with spurs 96, selected tracks 84 may then be unlatched and being then temporarily secured to sliding members 81 by any suitable means (not shown) such as spring clips or the like, when envelope 14 is raised, unlatched tracks 84 will also be elevated along with envelope 14, to which it is then temporarily secured.

Generally, a box car is provided with an inner lining, normally of wood paneling, such as lining 100 illustrated in FIGURE 8 of the drawings. In order to secure said lining 100 in place, vertical posts, preferably of wood, such as posts 101, may be mounted substantially parallel to side posts 50, and lining 100 may be fastened thereto, If lining 100 is substantially aligned with the outer surface of tracks 84, a flush inner wall lining of car 10 is accomplished.

Although a railroad box car is herein described and illustrated, it will be recognized that the present invention is equally applicable to any vehicle, such as, by way of illustration and not by way of limitation, a highway trailer or semi-trailer, or a lift van.

For instance, by way of illustration but not by way of limitation, hydraulic rams may be used in lieu of the screw devices herein described and illustrated for raising and lowering the envelope 14.

Although the invention has been herein shown and described, in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures and devices.

What is claimed is:

1. A vehicle which comprises: an undercarriage; a substantially rectangular floor mounted on said undercarriage; an envelope body having sides, ends, and a roof, open at the bottom, and substantially overlying said floor; vertical side posts mounted on the sides of said envelope body; means mounted adjacent the corners of said floor externally of said envelope body for elevating said envelope body above said floor a distance substantially equivalent to the height of said envelope body and lowering said envelope body to resting position on said floor; telescoping vertical side braces mounted on the sides of said envelope body; and means for selectively latching said telescoping side braces to said floor.

2. A vehicle as defined in claim 1, wherein each of said telescoping side braces comprises: a track; and a sliding member mounted on the sides of said envelope body and disposed in said track; and wherein the means for selectively latching said telescoping side braces to said floor comprises: a lateral opening adjacent the lower extremity of each of said tracks; and slidable bolts mounted on said floor, each of said slidable bolts being disposed so as to be received in the lateral opening in one of said tracks.

3. A vehicle as defined in claim 2, wherein said sliding bolt is spring-actuated.

References Cited in the file of this patent
UNITED STATES PATENTS

| | | |
|---|---|---|
| 559,964 | Bierstadt | May 12, 1896 |
| 2,538,736 | Spencer | Jan. 16, 1951 |
| 2,656,216 | Bobroff | Oct. 20, 1953 |
| 2,817,304 | Newcomer et al. | Dec. 24, 1957 |
| 2,821,428 | Webster | Jan. 28, 1958 |
| 2,944,852 | Snyder | July 12, 1960 |
| 2,949,867 | Ramsey | Aug. 23, 1960 |
| 2,977,900 | Farrar | Apr. 4, 1961 |
| 3,054,362 | Seidle | Sept. 18, 1962 |
| 3,059,886 | Lord | Oct. 23, 1962 |